United States Patent [19]

Johansson et al.

[11] 4,252,055
[45] Feb. 24, 1981

[54] TUNNEL-CHAMBER BAKING OVEN

[75] Inventors: Leif A. T. Johansson, Huddinge; Nils G. Pers; Staffan Lundgren, both of Upplands-Väsby, all of Sweden

[73] Assignee: Tipe Reven AB, Stockholm, Sweden

[21] Appl. No.: 46,697

[22] Filed: Jun. 8, 1979

[30] Foreign Application Priority Data

Jun. 19, 1978 [SE] Sweden ............................... 7807003

[51] Int. Cl.³ ............................................. A47J 37/06
[52] U.S. Cl. ................... 99/386; 99/443 C; 99/447; 99/449; 126/41 C; 126/261; 198/864; 432/121
[58] Field of Search ............. 99/443 C, 447, 449, 99/401, 386, 404, 357; 16/115; 219/400, 388; 198/864, 632; 126/27 SE, 261, 41 C; 432/2, 75, 76, 121, 239

[56] References Cited

U.S. PATENT DOCUMENTS

| 582,239 | 5/1897 | Snypp | 16/115 |
|---|---|---|---|
| 2,709,955 | 6/1955 | Hunter | 99/443 C |
| 3,019,744 | 2/1962 | Carvel | 99/443 C |
| 3,511,358 | 5/1970 | Peterson | 198/864 |
| 3,646,879 | 3/1972 | Palmason | 99/386 |
| 3,908,533 | 9/1975 | Fagerstrom | 99/443 C |

FOREIGN PATENT DOCUMENTS

| 1071612 | 8/1951 | Fed. Rep. of Germany | 99/443 C |
| 2458645 | 6/1975 | Fed. Rep. of Germany | 198/321 |
| 26900 | 5/1909 | Sweden | 99/433 C |
| 818391 | 8/1959 | United Kingdom | 99/443 C |

Primary Examiner—Billy J. Wilhite
Attorney, Agent, or Firm—Hill, Van Santen, Steadman, Chiara & Simpson

[57] ABSTRACT

A baking oven includes a thermally insulated casing that defines a tunnel-chamber through which an endless conveyor belt extends. The reversing elements at the end of the conveyor belt are supported by brackets that can tilt upwardly to shorten the effective length of the oven for shipment and, with the upper portion of the casing removed, to enable slackening of the conveyor belt, thereby facilitating manual raising of the central portion thereof for cleaning structure lying therebelow. The top of the casing serves as a countertop for preparing food, and the tunnel-chamber and conveyor belt lie therebelow thus conserving floor space.

9 Claims, 6 Drawing Figures

TUNNEL-CHAMBER BAKING OVEN

BACKGROUND OF THE INVENTION

1 Field of the Invention:

This invention relates to a baking oven for food, such as an oven for commercially baking pizza, namely an oven that has a driven endless conveyor belt passing through the baking chamber.

2. Prior Art:

Conventionl baking ovens normally provide baking temperatures in the range of 150° to 250° C. (302° to 482° F.). Ovens for baking pizza pies normally provide baking temperatures in the range of 288° to 371° C. (550° to 700° F.), the range of 316° to 343° C. (600° to 650° F.) being most typical in use.

Known tunnel-chamber ovens have a thermally insulated casing enclosing the tunnel chamber with openings at the tunnel ends through which an endless carrier or conveyor extends so that goods can continuously enter and leave the tunnel-chamber. The upper flight or portion of the conveyor usually runs immediately above a generally flat horizontal hearth forming the bottom of the tunnel-chamber. The conveyor extends beyond both ends of the tunnel-chamber such that the end portions of its upper flight are readily accessible for loading the goods at the inlet or entrance end of the tunnel and for unloading the baked goods at the exist end or outlet of the tunnel-chamber. Such a conveyor runs about a reversing roll or pulley at each end, each reversing roll being spaced outwardly from each end of the tunnel. One of the reversing rolls or elements is driven so as to move the conveyor. The casing encloses an air heater and an air moving and distributing system as that heated air is moved by one or more fans through a substantially closed circuit which includes the tunnel-chamber.

Tunnel-chamber ovens are generally quite bulky and have been used almost exclusively for large-volume production of bread. Further, they have not always been easy to clean. Furthermore, ovens of this type usually do not have the capability of operating at high enough a temperature to bake pizza pies.

SUMMARY OF THE INVENTION

The present invention is directed to a construction for a tunnel-chamber baking oven which is compact so that a minimum amount of space is occupied by it at a food-serving establishment. It also has a capability of doubling as a food-preparation counter. It also has a structure by which the length of the conveyor is temporarily collapsed to facilitate cleaning, and to minimize the space occupied by the oven during transit from the factory to the ultimate destination.

Accordingly, it is an object of the present invention to provide a compact pizzo oven.

A further object of the present invention is to provide an oven having food-preparation counter space on its upper surface.

Yet, another object of the present invention is to provide an oven that can be partially collapsed to facilitate cleaning and/or shipment.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
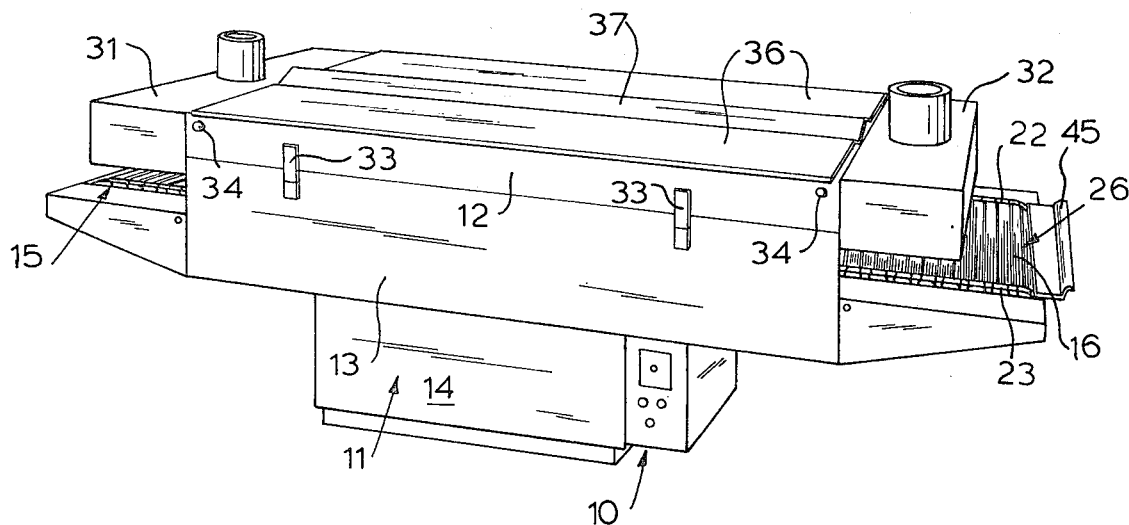
FIG. 1 is a perspective view of a tunnel-chamber baking oven provided in accordance with the present invention.

The principles of the present invention are particularly useful when embodied in a tunnel-chamber baking oven such as shown in FIG. 1, generally indicated by the numeral 10. The oven 10 includes a thermally insulated casing 11 having a pair of manually separable upper and lower portions 12, 13, the lower portion 13 also having a base or pedestal 14. An endless conveyor belt 15 has an upper conveying portion or flight 16 on which goods to be baked are supported, and a lower return portion or flight 17 shown schematically in FIG. 2.

Figure 2:
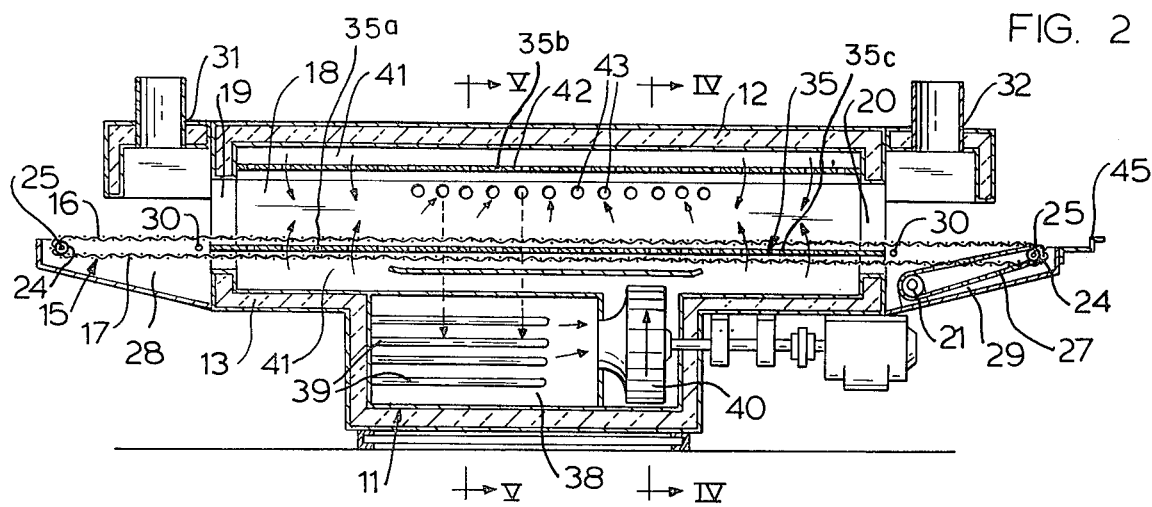
FIG. 2 is a longitudinal cross-sectional view of the oven shown in FIG. 1.

As shown in FIG. 2, a tunnel 18 extends through the casing 11 and has an entrance end or inlet 19 and a discharge end or outlet 20. A motor 21 is connected to drive the conveyor belt 15.

The conveyor belt 15 includes a pair of spaced roller chains 22, 23 which extend about a pair of sprockets 24,24 carried on a shaft 25, the conveyor belt further including a wire mesh 26 which is linked together and which is joined to the roller chains 22,23. A similar construction is provided at each end of the oven 10, except that the motor 21 is located at the right end as shown in FIG. 2 and includes a further drive chain 27 leading to a further sprocket on the right-hand shaft 25.

Adjacent to the inlet 19 and the outlet 20 of the tunnel chamber, the lower portion 13 of the casing supports a cantilever bracket 28, 29 respectively. Such support is provided by a pair of rods 30,30 which extend in parallel relation to the shaft 25,25 and at a right angle to the direction of travel of the conveyor belt 15. The rods 30,30 are disposed just outside of the tunnel-chamber 18, but this location is not critical as the same could be disposed just inside the same. The location of the pivotal support rods 30,30 enables the brackets 28,29 to be pivoted upwardly for an angle of 90° in this embodiment, and this angle can be exceeded if desired.

The oven 10 has a hood 31 and a hood 32 disposed just above the inlet 19 and the outlet 20 for conducting away any hot air that might escape from the tunnel 18. The hoods 31,32 are manually removable by means not shown to enable the upward pivoting of the brackets 28,29 as described.

Figure 3:
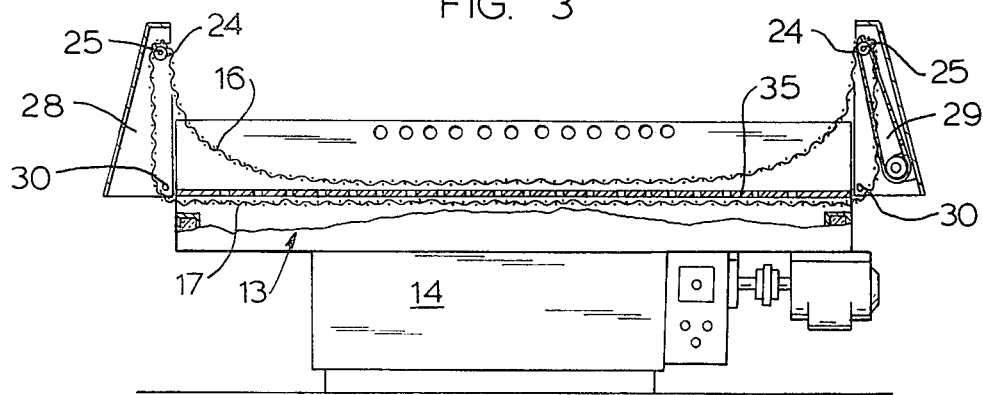
FIG. 3 is a longitudinal cross-sectional view corresponding to FIG. 2 with parts shown in elevation and other parts shown schematically, but with the upper part of the oven casing removed and with the conveyor in a collapsed position.
Figure 5:
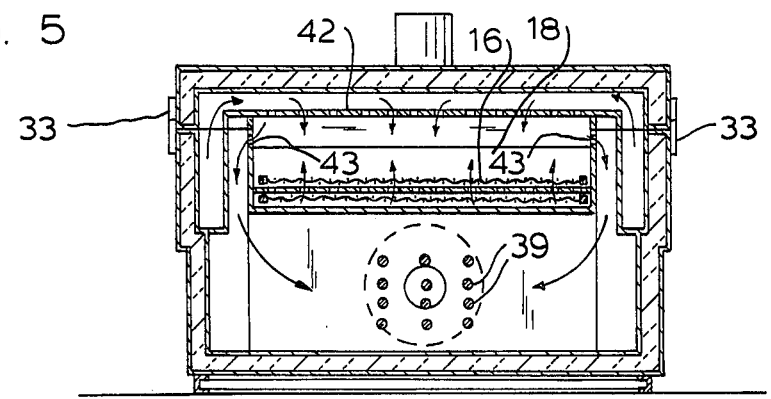
FIG. 5 is a cross-sectional view taken along line V—V of FIG. 2.
Figure 4:
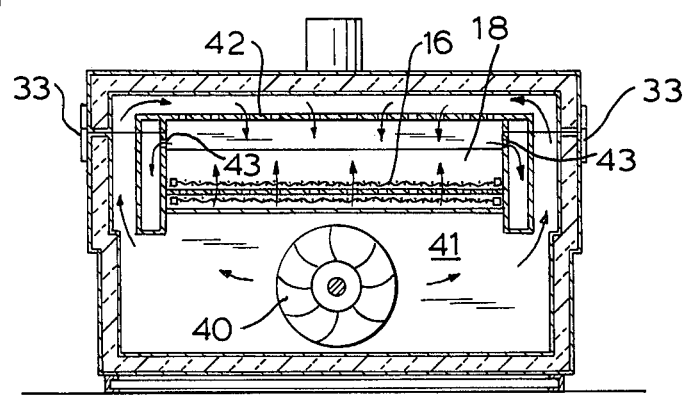
FIG. 4 is a cross-sectional view taken along line IV—IV of FIG. 2.

As best shown in FIG, 1, the upper portion 12 and the lower portion 13 of the casing 11 are held together by a number of manually releasable hasps 33. Assuming any vent pipe has been removed from the hoods 31,32, a number of rod-like handles 34 which are telescopically stored in the upper casing portion 12, are withdrawn to provide a handle or grip. In this manner, the upper portion 12 of the casing may be manually removed. As best seen in FIGS. 4 and 5, doing so exposes the upper flight 16 of the conveyor belt which lies at the bottom of the tunnel-chamber 18. The brackets 28,29 can then be pivoted to an upright position as shown in FIG. 3. Doing so provides a good deal of slack in the upper flight 16 and also in the lower flight 17 of the belt conveyor 15. The upper flight 16 can now be manually raised, and doing so exposes the bottom or hearth 35 of the tunnel-chamber 18. If desired, some type of prop or support may be used to hold the upper flight out of the way. With the hearth 35 exposed, its upper surface can be readily cleaned. The hearth 35 preferably comprises several segments 35a, 35b, and 35c shown only in FIG. 2, and this element is also manually removable. On removal of the hearth 35, the lower flight 17 is exposed, such as for cleaning. Thus, the outside of the conveyor belt 15 can be cleaned when it is in the upper flight position and the inside of the belt conveyor can be readily reached when it is in the lower flight position. By a raising of the lower flight also, access is provided to the space therebeneath to enable further cleaning. When the upper casing portion 12 is removed, there is no obstruction that interfers with the raising of the upper flight 16. Similarly, there is no obstruction that prevents access to the hearth 35 when the upper flight 16 is raised, and there is no obstruction to the lower part of the casing 13 when the lower flight 17 is raised.

As best seen in FIGS. 2, 4 and 5, the upper surface or side of the casing is substantially smooth. The oven 10 is so dimensioned that this side has a height from the floor which corresponds to that of a food-preparation counter so that substantially the entire upper surface of the oven 10 may have a further function of being a countertop. If desired, an added food-preparation sheet may be provided along either side, along with a shelf or rack 37 for storing food supplies in a slightly elevated or cocked position with respect to the upper surface of the oven.

The tunnel-chamber 18 is heated by hot air circulating through a substantially closed circuit. A chamber 38 in the pedestal portion 14 has a number of electric heating elements 39 and is connected to the inlet of a fan 40 which discharges into a plenum 41 that has portions lying above and below the tunnel-chamber 18, the upper and lower portions of the plenum 41 shown in FIG. 2 being connected together as shown in FIG. 4. Hot air passes through perforations in the hearth 35 and through perforations in a distribution panel 42 that is secured to the upper portion 12 of the casing 11. Air enters the tunnel-chamber 18 just inwardly of both the inlet and the outlet thereof and moves to the center and passes outwardly through a series of apertures 43 which lead outwardly through the lateral walls of the tunnel-chamber, and back to the chamber 38 for reheating, as shown in FIGS. 2 and 5.

Figure 6:
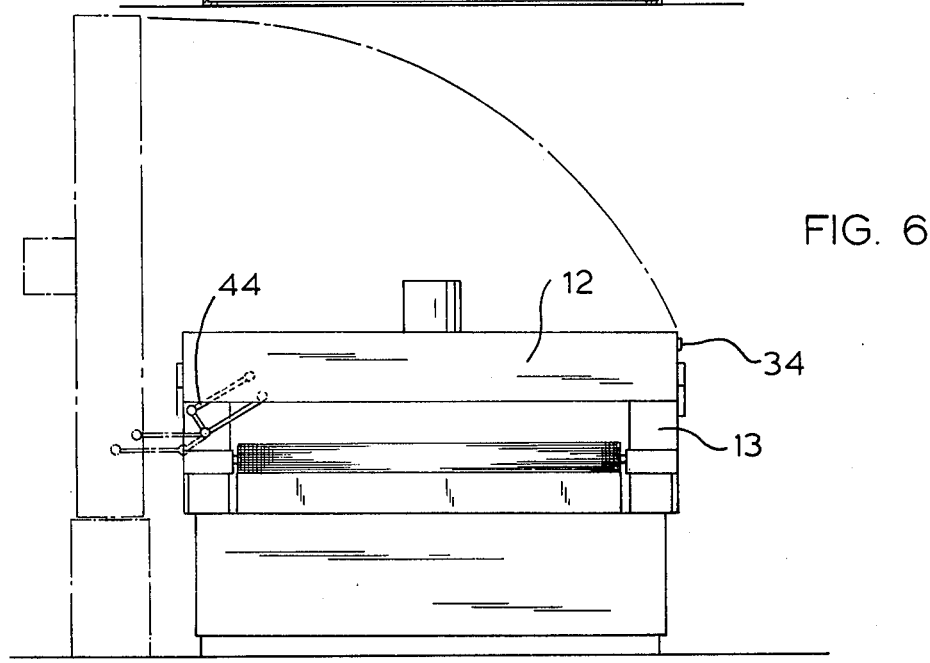
FIG. 6 is an elevational view of the left end of FIG. 1, showing an alternate construction for removing the upper part of the casing.

As shown in FIG. 6, a linkage 44 may be provided to serve as a hinge between one side of the lower part 13 of the casing and one edge of the upper part 12 of the casing, the phantom lines indicating the path of movement that the upper portion would take, much like a cover in being pivoted to a position that is equivalent to that shown in FIG. 3, namely out of the way. It is believed that a number of separate handles represents a less expensive structure that is less apt to malfunction.

The brackets 28,29 may be placed in the upright position when the oven is being shipped, such as from the manufacturer to the user. In such position, the length of the oven during shipment is reduced, and the raised position of the brackets enables the oven to be stowed transversely in a standard shipping container such as is presently used in ocean, train and truck shipments.

In use, the floor space occupied by the oven 10 is also the floor space occupied by the counter used for preparing the pizza pies to be baked, namely the upper surface of the oven 10. The structure is such that employees can work on both sides of the oven at the same time in preparing the food products to be baked, and a minimum number of steps is utilized to place the same on the entrant end of the conveyor belt 15. The discharge end of the conveyor belt 15 can be placed in super-position to an appropriate receiver, and if desired, a guard 45 carried by the brackets at the discharge end may be used to arrest movement of the baked goods after discharge but while still carried by the moving conveyor belt.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A tunnel-chamber baking oven adapted to be heated by hot air circulating through a substantially closed circuit, said oven comprising:
    (a) a thermally insulated casing encircling the oven tunnel-chamber, and having an inlet and an outlet therein;
    (b) an endless motor-driven conveyor belt having an upper flight for supporting goods to be baked, and a lower return flight, said flight's extending between a first reversing element upstream of said inlet, through said tunnel-chamber, and a second reversing element downstream of said outlet;
    (c) a pair of brackets pivotally supported as cantilevers on opposite ends of said casing for pivoting about a horizontal axis through an angle of 90° and respectively supporting said reversing elements for rotation about other horizontal axes.

2. An oven according to claim 1, the pivotal axes of said brackets being disposed immediately adjacent to said inlet and said outlet, respectively.

3. An oven according to claim 1, said casing comprising separable upper and lower portions latched together by manual latches, said upper portion normally being disposed above the tunnel chamber.

4. An oven according to claim 3, said upper flight of said conveyor belt being free of obstructions and thereby enabled to be freely lifted in response to removal of said upper casing and upward pivoting of at least one of said brackets.

5. An oven according to claim 4, said lower casing portion having a manually removable apertured hearth normally defining the apertured floor of the tunnel chamber, and being disposed between said flights, said hearth being enabled to be freely removed in response to said upper flight's being lifted, and said lower flight being enabled to be freely lifted in response to removal of said hearth.

6. An oven according to claim 5, said hearth comprising a plurality of sheet-like segments.

7. An oven according to claim 3, including a plurality of rod-like handles secured to said upper portion, each said handle being axially slideable in a direction parallel to the axes of said reversing elements into said upper portion to a substantially nonprojecting position.

8. An oven according to claim 1, said casing having a substantially smooth horizontal obstruction-free upper side located above the insulation at a height enabling it to be used as a countertop.

9. An oven according to claim 8, including a food-preparation sheet removably positioned flatwise on said upper side.

* * * * *